(12) United States Patent
Kuryatnyk et al.

(10) Patent No.: US 9,656,918 B2
(45) Date of Patent: May 23, 2017

(54) HYDRAULIC BINDER BASED ON GROUND GRANULATED BLAST FURNACE SLAG HAVING IMPROVED SETTING IMPROVED CURING

(71) Applicant: BOSTIK SA, La Plaine Saint Denis (FR)

(72) Inventors: Tetyana Kuryatnyk, Moissy Cramayel (FR); Jeremy Becquet, Moissy Cramayel (FR)

(73) Assignee: BOSTIK SA, La Plaine Saint Denis (FR)

( * ) Notice: Subject to any disclaimer, the term of this patent is extended or adjusted under 35 U.S.C. 154(b) by 0 days.

(21) Appl. No.: 14/928,480

(22) Filed: Oct. 30, 2015

(65) Prior Publication Data
US 2016/0122246 A1 May 5, 2016

(30) Foreign Application Priority Data

Oct. 30, 2014 (FR) .................................... 14 60440

(51) Int. Cl.
| | |
|---|---|
| *C04B 28/08* | (2006.01) |
| *C04B 28/14* | (2006.01) |
| *C04B 18/14* | (2006.01) |
| *C04B 40/06* | (2006.01) |
| *C04B 111/00* | (2006.01) |
| *C04B 111/60* | (2006.01) |

(52) U.S. Cl.
CPC ............ *C04B 28/08* (2013.01); *C04B 18/141* (2013.01); *C04B 28/14* (2013.01); *C04B 40/065* (2013.01); *C04B 2111/00017* (2013.01); *C04B 2111/00146* (2013.01); *C04B 2111/00215* (2013.01); *C04B 2111/00517* (2013.01); *C04B 2111/00646* (2013.01); *C04B 2111/00672* (2013.01); *C04B 2111/60* (2013.01); *Y02P 40/143* (2015.11); *Y02W 30/94* (2015.05)

(58) Field of Classification Search
CPC .. C04B 7/02; C04B 7/147; C04B 7/32; C04B 7/323; C04B 8/14; C04B 14/06; C04B 14/28; C04B 14/303; C04B 18/141; C04B 20/0076; C04B 20/008; C04B 22/0013; C04B 22/064; C04B 22/085; C04B 22/124; C04B 22/143; C04B 24/24; C04B 24/2623; C04B 24/2629; C04B 24/2641; C04B 24/2676; C04B 28/14; C04B 28/08; C04B 40/065; C04B 2111/00017; C04B 2111/00146; C04B 2111/00215; C04B 2111/00646; C04B 2111/00672; C04B 2111/60; C04B 2111/00517
See application file for complete search history.

(56) References Cited

U.S. PATENT DOCUMENTS

| | | | |
|---|---|---|---|
| 6,409,819 B1 | 6/2002 | Ko | |
| 6,409,820 B1 | 6/2002 | Novak | |
| 6,572,698 B1 | 6/2003 | Ko | |
| 7,294,193 B2 * | 11/2007 | Comrie | ................. C04B 28/006 106/697 |
| 8,419,851 B2 * | 4/2013 | Ibaraki | .................... C04B 28/08 106/713 |
| 8,440,016 B2 * | 5/2013 | Ibaraki | .................... C04B 28/08 106/772 |
| 8,932,402 B2 * | 1/2015 | Hesselbarth | .......... C04B 7/1535 106/695 |
| 2003/0167972 A1 | 9/2003 | Ko | |
| 2014/0144349 A1* | 5/2014 | Raz | ......................... C04B 28/08 106/707 |

FOREIGN PATENT DOCUMENTS

| | | |
|---|---|---|
| DE | 3049003 A1 | 9/1981 |
| DE | 4135144 A1 | 6/1992 |
| EP | 0029069 A1 | 5/1981 |
| EP | 1195361 A1 | 4/2002 |
| EP | 1975135 A2 | 10/2005 |
| GB | 2250282 B | 3/1995 |
| JP | H10231165 A | 9/1998 |
| JP | 2006-265011 A * | 10/2006 |
| WO | 0000447 A1 | 1/2000 |

OTHER PUBLICATIONS

Machine Translation of European Patent Specification No. EP 1975135 A2 (Oct. 2008).*
French Search Report for FR14/60.440 Dated Jul. 22, 2015.
English Translation of JPH10231165, Publication Date: Sep. 2, 1998.
English Translation and Abstract of EP1975135, Publication Date Oct. 1, 2008.
English Abstract of DE3049003, Publication Date: Sep. 10, 1981.
English Abstract EP1195361, Publication Date: Apr. 10, 2002.

* cited by examiner

*Primary Examiner* — Anthony J Green
(74) *Attorney, Agent, or Firm* — Millen, White, Zelano and Branigan, P.C.

(57) ABSTRACT

Disclosed are a hydraulic binder composition containing at least 50% by weight of ground granulated blast furnace slag and a system for activating the slag, the system containing at least calcium sulphate, at least one product chosen from a source of Portland clinker and lime, at least one aluminum derivative and at least one alkali metal or alkaline earth metal salt; containing a ready-to-mix building material composition comprising such a hydraulic binder and aggregates of inert material capable of being agglomerated in the presence of an aqueous phase; and a process for employing the ready-to-mix composition containing a stage of mixing the said composition with water for the purpose of the preparation of a building material, such as a concrete or mortar, and in particular an adhesive mortar, pointing mortar or levelling mortar or coating.

14 Claims, 2 Drawing Sheets

HYDRAULIC BINDER BASED ON GROUND GRANULATED BLAST FURNACE SLAG HAVING IMPROVED SETTING IMPROVED CURING

The present invention relates to a hydraulic binder composition comprising at least 50% by weight of ground granulated blast furnace slag (with respect to the weight of the said binder) and a system for activating the said slag, the said system comprising at least calcium sulphate, at least one product chosen from a source of Portland clinker and lime, at least one aluminium derivative and at least one alkali metal or alkaline earth metal salt.

The present invention also relates to a ready-to-mix building material composition comprising such a hydraulic binder and inert material aggregates capable of being agglomerated in the presence of an aqueous phase.

The present invention also relates to a process for employing the ready-to-mix composition according to the invention, comprising a stage of mixing the said composition with water, for the purpose of the preparation of a construction material, such as a concrete or mortar, and in particular an adhesive mortar, pointing mortar or levelling mortar or coating.

Hydraulic binders are essentially composed of inorganic compounds and are characterized by their ability to irreversibly set and cure when they are brought into contact with water. The development of the final properties of the binder depends on the reactions which take place on contact with water and on the nature of the reaction products. In contrast to the nonhydraulic binder, the hydrates formed during the hydration reactions of the hydraulic binder are insoluble in water. After curing, a rigid product is obtained which is stable on contact with water and which retains its mechanical (strength) properties even under water.

Among the existing hydraulic binders, Portland cement is undoubtedly one of the most widely used in the world. Composed of at least 95% by weight of Portland clinker and up to 5% by weight of calcium sulphate, Portland cement, mixed with inert material aggregates and mixed with water in an appropriate fashion, is capable of producing a mortar or a concrete which retains its workability for a sufficiently long time for it to be processed and makes it possible to sufficiently rapidly achieve mechanical properties (in particular mechanical strength) which are satisfactory for the targeted application, while exhibiting a degree of dimensional stability.

However, in the face of increasing environmental challenges, the cement industries are now forced to limit the use and the production of Portland cement.

The process of the manufacture of Portland cement is energy intensive and generates high emissions of carbon dioxide ($CO_2$).

Portland clinker is a product based on calcium silicate and aluminate, obtained by calcining, at high temperature (approximately 1450° C.), a mixture of limestone and clay in predetermined proportions (respective proportions of 80%/20% by weight approximately), followed by rapid cooling of the mixture.

During the stage of calcining the limestone to give quicklime (calcium oxide, CaO), large amounts of $CO_2$ are emitted.

In addition, the product obtained after cooling the mixture exists in the form of granules which are crushed before being finely ground with calcium sulphate in order to be able to form the Portland cement, which generates additional energy costs.

Another disadvantage related to the use of a large amount of Portland cement is that the Portland clinker is a sensitizing and irritating agent for the body, in particular the skin, the eyes and respiratory tracts, where it is present at more than 10% by weight in a product. In fact, in the majority of countries, regulations require that specific precautions be taken and in particular that safety rules and/or devices be introduced for the handling of products having a high content of Portland clinker.

Research has thus been directed at the development of novel types of hydraulic binders comprising industrial waste, namely byproducts of the iron and steel industry, such as blast furnace slags. However, in contrast to Portland clinker, these byproducts of the iron and steel industry are compounds having a latent hydraulic nature, that is to say that activation is necessary in order for them to rapidly develop, on contact with water, advantageous mechanical properties. This is because the addition of water to a sample of unactivated blast furnace slag does not result in any phenomenon of setting or curing of the mixture.

The activation of blast furnace slag can be carried out by addition of one or more chemical compounds of specific nature.

The activation of the blast furnace slag can be obtained by addition either of an alkaline agent (for example soda or lime) or of a sulphate-based agent (for example gypsum), or of a combination of the two types of agents: gypsum and soda or gypsum and lime. In the presence of Portland cement, the blast furnace slag can be activated by the lime, which releases the hydrated Portland clinker, and by the calcium sulphate.

However, the use of alkaline activators at high contents in the binder or in the building material presents health problems as they are capable of causing serious skin irritation.

Furthermore, although the use of calcium sulphate exhibits the advantage of not being irritating or sensitizing to the body, building materials manufactured with such a binder often exhibit problems of stability over time. They are generally not very resistant to water and repeated or prolonged contact with water or damp conditions (bad weather, damp confined space, immersion in water, and the like) can result in a loss of mechanical strength and of durability of the building materials.

U.S. Pat. No. 6,409,820 discloses a hydraulic binder composition comprising 85% by weight of granulated blast furnace slag having a particle fineness of 5800 $cm^2/g$, 13% by weight of a synthetic gypsum corresponding to an $SO_3$ equivalent content of 6.1% by weight, 1% by weight of Portland cement and 0.5% by weight of calcium acetate, these combined contents being expressed on the basis of the total weight of the hydraulic binder composition.

Although this binder exhibits reduced contents of Portland cement, it remains to be improved, in particular in terms of rate of setting and of curing.

Thus, there exists a need to make available a hydraulic binder based on blast furnace slag which makes it possible to overcome, in all or part, the abovementioned disadvantages of the prior art.

In particular, there exists a need to develop a hydraulic binder based on blast furnace slag which exhibits an improved rate of setting and of curing, with respect to the hydraulic binder of U.S. Pat. No. 6,409,820, and which makes it possible to obtain a building material which has in particular in the short term improved mechanical properties. In the context of the present patent application, short-term mechanical properties are generally measured from 24 hours and up to 28 days, starting from the preparation of the building material.

The use of a hydraulic binder having such properties can be advantageous for numerous applications in the field of construction for manufacturing concretes or mortars for which a rapid return to service of the structure is expected, with a certain level of mechanical strength to be achieved at a given date.

For example, such a hydraulic binder can be used to manufacture fixing mortars, such as adhesive mortars, or pointing mortars, for which rapid and effective adhesion or pointing is desired.

The use of such a hydraulic binder can also be desired in order to manufacture levelling mortars, in particular floor coatings, for which it is desired to reduce the period of time until they can be stepped on. The qualities desired for a levelling coating are, inter alia, defined in the specifications of the Centre Scientifique et Technique du Bâtiment (CSTB) [French Scientific and Technical Centre for Building (CSTB)] relating to floor coatings.

The use of such a hydraulic binder can also be desired in order to manufacture repairing or filling mortars capable of rapidly and efficiently filling in defects (cracks, holes) at the surface of a building material, such as concrete, brick or plaster.

Furthermore, there exists a need to have a hydraulic binder additionally exhibiting a reduced environmental and health impact in comparison with Portland cement, thus making it possible to obtain a building material which is friendlier towards man and the environment. In particular, it is desired to be able to formulate, starting from such a binder, a building material which can be handled, transported or manufactured without deploying specific safety arrangements.

There also exists a need to provide a hydraulic binder which is insensitive or relatively insensitive to external agents, such as water and moisture, making it possible to manufacture a durable building material which is resistant in particular to repeated and/or prolonged exposures to such agents.

Finally, there exists a need to obtain a building material, such as a concrete or mortar, exhibiting one or more of the abovementioned advantages and in addition meeting the desired criteria of mechanical performance, in particular in the short term, of adhesion and/or of suitability for use (homogeneity of mixing, fluidity for spreading or self-spreading) from a viewpoint of the use targeted.

Surprisingly, it has been discovered that a hydraulic binder according to the invention as defined below makes it possible to meet, in all or part, the abovementioned needs.

In particular, it has been discovered that the combination of at least one calcium sulphate, of at least one product chosen from a source of Portland clinker and lime, of at least one specific aluminium derivative and of at least one specific alkali metal or alkaline earth metal salt as defined more specifically below makes it possible to obtain a better activation of a granulated blast furnace slag, in fact resulting in a hydraulic binder exhibiting an improved rate of setting and of curing in water, with respect to the prior art.

The hydraulic binder according to the invention is furthermore friendly to man and the environment, in particular from the viewpoint of Portland cement. In fact, the hydraulic binder according to the invention makes it possible to obtain a building material exhibiting these same advantages.

In addition, by virtue of its hydraulic power, the hydraulic binder according to the invention makes it possible to obtain a building material capable of rapidly developing satisfactory mechanical properties (hardness, flexural strength, compressive strength and/or adhesion).

It has been found in particular that it is possible to obtain, starting from a hydraulic binder according to the invention, a building material exhibiting a good suitability for use (homogeneity of mixing and/or ease of processing) after its ingredients have been mixed with water.

It has also been found that it is possible to obtain, starting from a hydraulic binder according to the invention, a building material which is durable or stable over time.

In particular, the mechanical properties of the building material according to the invention are not or not significantly damaged over time, even after prolonged contact with water. The building material is thus particularly suitable for being used in applications in which the material is liable to be subjected to prolonged or repeated contact with water (rain) or a high degree of humidity (greater than or equal to 50% of relative humidity).

In particular, the building material according to the invention exhibits a good flexural strength.

In particular, the building material according to the invention exhibits good dimensional stability over time.

It has been found in particular that it is possible to obtain a levelling mortar or coating, in particular for floors, having excellent short-term mechanical properties (flexural strength, compressive strength) while having good self-spreading and dimensional stability properties over time.

A subject-matter of the present invention is thus, first, a hydraulic binder composition comprising:

a) at least 50% by weight, with respect to the weight of the hydraulic binder composition, of a ground granulated blast furnace slag, b) at least calcium sulphate, c) at least one product chosen from a source of Portland clinker and lime, d) at least one aluminium derivative chosen from an alumina having a BET specific surface ranging from 100 to 400 m$^2$/g, a monocalcium aluminate and a calcium sulphoaluminate, and e) at least one alkali metal or alkaline earth metal salt chosen from chloride salts, bromide salts, silicate salts, nitrate salts or carboxylic acid salts, such as $C_1$-$C_4$ monocarboxylic acid salts, the total content of calcium sulphate, expressed as $SO_3$ equivalent content, being at least 5% by weight, with respect to the weight of the hydraulic binder composition, the sum of the contents of the products cited in points c) and e) being less than 10% by weight, with respect to the weight of the hydraulic binder composition.

Other subject-matters, characteristics and advantages of the present invention will become more clearly apparent on reading the description and examples.

In the present patent application, unless otherwise indicated:

the amounts expressed in the form of percentage correspond to weight/weight percentages, the indefinite article "a" or "an" used to denote an ingredient of a composition according to the invention (binder, building material) should be understood as "one or more", thus including the mixture of these ingredients. It is the same for the use of the corresponding definite article "the", which should be understood as including the mixture of several of these ingredients. For example, "a" ground granulated blast furnace slag denotes a ground granulated blast furnace slag or a mixture of ground granulated blast furnace slags.

"Blaine fineness" or "Blaine specific surface" denotes the specific surface of a solid pulverulent compound, expressed in cm² per gram of solid, measured by the air permeametry method (or Blaine method). This method is described by French Standard NF EN 196-6.

the terms "hydraulic binder" and "hydraulic binder composition" are denoted without distinction in the present patent application. Likewise, the terms "building material" and "building material composition" are denoted without distinction.

The hydraulic binder composition according to the invention comprises at least 50% by weight of ground granulated blast furnace slag, with respect to the weight of the said composition.

The ground granulated blast furnace slag which can be used according to the invention is provided in the form of particles.

The maximum size of the particles of the ground granulated blast furnace slag which can be used according to the invention is preferably less than 45 μm.

This maximum size of the particles of the ground granulated blast furnace slag which can be used according to the invention is determined in a way well known to a person skilled in the art by laser particle size analysis.

In particular, at least 99% by volume of the particles of the ground granulated blast furnace slag which can be used according to the invention preferably make less than 32 μm.

More particularly, at least 50% by volume of said particles preferably make less than 10 μm and more preferably less than 5.5 μm. These particles thus exhibit a mean diameter D50 preferably of less than 10 μm and more preferably of less than 5.5 μm.

The particle size analysis of the volume-average size of the particles of the ground granulated blast furnace slag which can be used according to the invention can be carried out in a way well known to a person skilled in the art by laser particle size analysis.

The Blaine specific surface of the ground granulated blast furnace slag which can be used according to the invention is preferably greater than or equal to 5000 cm²/g, and more preferably greater than or equal to 6000 cm²/g. More preferably still, the Blaine specific surface of the ground granulated blast furnace slag which can be used according to the invention ranges from 6500 to 9000 cm²/g and better still from 7000 to 8000 cm²/g.

The chemical composition of the ground granulated blast furnace slag which can be used according to the invention comprises calcium oxide (CaO), magnesium oxide (MgO), silicon dioxide or silica ($SiO_2$), and aluminium oxide ($Al_2O_3$) in contents such that the sum of the contents of calcium oxide, magnesium oxide and silicon dioxide represents at least two thirds by weight (66.7% by weight) of the weight of the ground granulated blast furnace slag and the ratio by weight of the sum of the contents of calcium oxide and magnesium oxide to the content of silicon dioxide (denoted (CaO+MgO)/$SiO_2$) is greater than 1.0.

Preferably, the ground granulated blast furnace slag which can be used according to the invention additionally comprises a glassy phase representing at least two thirds by weight of the ground granulated blast furnace slag which can be used according to the invention.

More preferably, the ground granulated blast furnace slag which can be used according to the invention comprises at least 90% by weight and more preferably at least 95% by weight of glassy phase, with respect to the weight of the ground granulated blast furnace slag.

Preferably, the chemical composition of the ground granulated blast furnace slag which can be used according to the invention is such that the sum of the contents by weight of calcium oxide (CaO), magnesium oxide (MgO), silica ($SiO_2$) and aluminium oxide ($Al_2O_3$) is greater than or equal to 80% by weight, more preferably greater than or equal to 90% by weight and better still greater than or equal to 95% by weight, with respect to the weight of the ground granulated blast furnace slag.

Preferably, the chemical composition of the ground granulated blast furnace slag which can be used according to the invention comprises less than 39% by weight of silica, less than 15% by weight of aluminium oxide ($Al_2O_3$), more than 37% by weight of calcium oxide (CaO) and less than 13% by weight of magnesium oxide (MgO), with respect to the weight of the ground granulated blast furnace slag.

More preferably, the chemical composition of the ground granulated blast furnace slag which can be used according to the invention comprises from 33 to 37% by weight of silica ($SiO_2$), from 9 to 14% by weight of aluminium oxide ($Al_2O_3$), from 38 to 42% by weight of calcium oxide (CaO) and from 1 to 12% by weight of magnesia (MgO), with respect to the weight of the ground granulated blast furnace slag.

Better still, the chemical composition of the ground granulated blast furnace slag which can be used according to the invention additionally comprises less than 1% by weight of $Fe_2O_3$, less than 2% by weight of $TiO_2$, up to 2.5% by weight of $SO_3$ and up to 2% by weight of sulphide ($S^{2-}$) ions, with respect to the total weight of ground granulated blast furnace slag.

The amounts of calcium oxide, magnesia, alumina and silica present in the ground granulated blast furnace slag which can be used according to the invention preferably satisfy at least one of the following three relationships:

$$r1 = \frac{(CaO + MgO)}{(Al2O3 + SiO2)} > 1.03$$

$$r2\ (F11) = \frac{(CaO + MgO + 0.3 * Al2O3)}{(SiO2 + 0.7 * Al2O3)} > 1.20$$

$$r3\ (F3) = \frac{(CaO + MgO + Al2O3)}{(SiO2)} \geq 1.6,$$

and the content of aluminium oxide ($Al_2O_3$) being less than 13% by weight of the weight of ground granulated blast furnace slag, r1, r2 and r3 corresponding to the ratios by weight relating to the amounts of calcium oxide, magnesia, alumina and silica present in the ground granulated blast furnace slag.

More preferably, the amounts of calcium oxide, magnesia, alumina and silica present in the ground granulated blast furnace slag satisfy the three relationships r1, r2 and r3 defined above.

The ground granulated blast furnace slag which can be used according to the invention can be obtained in a way well known to a person skilled in the art. The blast furnace slag is a byproduct of the production of cast iron, which is obtained by melting iron ores in a blast furnace at a temperature greater than the temperature of the melting point of the cast iron and slag, for example greater than 1500-1600° C. The blast furnace slag and the cast iron are separated by difference in density in the liquid state. The blast furnace slag will then be subjected to rapid cooling, which will vitrify the blast furnace slag. The vitrified blast furnace slag thus obtained is commonly denoted under the name "granulated blast furnace slag". The latter is subsequently dried and ground in order to obtain a ground granulated blast furnace slag having the desired fineness and/or particle size.

The ground granulated blast furnace slag which can be used according to the invention can result directly or indirectly from the above described preparation process. In particular, the ground granulated blast furnace slag which can be used according to the invention can result from a comilling of two or more granulated blast furnace slags or from the mixing of two or more ground granulated blast furnace slags or can form the subject of adjustment with regard to its composition by additions of metal oxide, reheating in the blast furnace and then quenching, as taught in Application CA 1 131 664.

The hydraulic binder composition according to the invention preferably comprises a total content of ground granulated blast furnace slag(s) ranging from 50 to 90% by weight and more preferably from 60 to 70% by weight, with respect to the weight of the hydraulic binder composition.

The hydraulic binder composition according to the invention comprises at least calcium sulphate in a specific content.

Generally, the term calcium sulphate (generally denoted $CaSO_4$) covers calcium sulphate under any of its hydrated or nonhydrated forms and the various mixtures of the said hydrated or nonhydrated forms.

Thus, the calcium sulphate which can be used according to the invention can be chosen from anhydrous calcium sulphate (or anhydrite) (generally denoted anhydrous $CaSO_4$), calcium sulphate semihydrate (hemihydrate or bassanite) (generally denoted $CaSO_4.0.5H_2O$), calcium sulphate dihydrate (or gypsum) ($CaSO_4.2H_2O$) and the mixtures of these compounds.

Preferably, the calcium sulphate which can be used according to the invention comprises at least 90% by weight and more preferably at least 95% by weight of anhydrous calcium sulphate, with respect to the weight of calcium sulphate. Better still, the calcium sulphate which can be used according to the invention is anhydrous calcium sulphate.

The calcium sulphate which can be used according to the invention preferably has a pH of greater than or equal to 7, more preferably of greater than or equal to 8 and better still of greater than or equal to 11.

The calcium sulphate which can be used according to the invention can be of natural or synthetic origin.

In particular, the calcium sulphate which can be used according to the invention can be obtained by the synthetic route as byproduct from the manufacture of an inorganic acid (boric acid, hydrofluoric acid, phosphoric acid), of an organic acid (citric acid, tartaric acid) or of titanium oxide. It can also be obtained by desulphurization of gases, including flue gases.

The total content by weight of calcium sulphate present in the hydraulic binder composition according to the invention is expressed as $SO_3$ equivalent content by weight. The calcium sulphate present in the hydraulic binder composition of the invention can optionally be introduced in part by other ingredients of the hydraulic binder, in particular when the source of Portland clinker is a cement (Portland, blended or pozzolanic) as described subsequently. However, the total content of calcium sulphate present in the hydraulic binder composition according to the invention, expressed as $SO_3$ content, has to be greater than 5% by weight, with respect to the weight of the hydraulic binder, in order to rapidly achieve satisfactory mechanical properties with regard to the cured product.

Preferably, the hydraulic binder composition according to the invention comprises a total content by weight of calcium sulphate, expressed as $SO_3$ equivalent content by weight, ranging from 5 to 25% by weight and more preferably from 13 to 20% by weight, with respect to the weight of the hydraulic binder composition.

The hydraulic binder composition according to the invention comprises at least one product chosen from a source of Portland clinker, lime, and their mixture.

The source of Portland clinker which can be used according to the invention can be chosen from a Portland clinker, a Portland cement, a blended Portland cement, a pozzolanic cement and their mixtures.

In particular, use may be made, as source of Portland clinker, of a Portland clinker comprising:
at least the following crystalline mineralogical phases:
tricalcium silicate and dicalcium silicate ($3CaO.SiO_2$ and $2CaO.SiO_2$, respectively denoted $C_3S$ and $C_2S$),
tetracalcium aluminoferrite ($Al_2O_3.Fe_2O_3.4CaO$, denoted $C_4AF$),
and optionally tricalcium aluminate ($Al_2O_3.3CaO$, denoted $C_3A$),
in contents such that:
the crystalline mineralogical phases $C_3S$ and $C_2S$ represent at least two thirds of the weight of the Portland clinker,
the total contents of calcium oxide and of silica are such that the $(CaO)/(SiO_2)$ ratio by weight is greater than or equal to 2,
and optionally magnesium oxide (MgO) in a content of less than or equal to 5% by weight of the weight of the Portland clinker.

Preferably, the $(CaO)/(SiO_2)$ ratio by weight is greater than or equal to 3.

Preferably, the content of magnesium oxide is less than or equal to 1% by weight of the weight of the Portland clinker.

The Portland clinker can additionally comprise one or more of the following chemical components: phosphorus fluoride (PF), titanium dioxide ($TiO_2$), manganese oxide (MnO), sodium oxide ($Na_2O$), phosphorus pentoxide ($P_2O_5$) or strontium oxide (SrO).

In particular, use may be made, as source of Portland clinker, of a Portland cement of CEM I type as defined by French Standard NF EN 197-1. Such a cement comprises at least 95% by weight of Portland clinker, with respect to the weight of the said cement. The Portland clinker is preferably as defined in any one of the sections of the present patent application. More preferably, use is made of a Portland cement of CEM I 52.5 R type as defined by French Standard NF EN 197-1.

In particular, use may be made, as source of Portland clinker, of a blended Portland cement of CEM II type as defined by French Standard NF EN 197-1. Such a cement comprises from 65 to 94% by weight of Portland clinker, with respect to the weight of the said cement. The Portland clinker is preferably as defined in any one of the sections of the present patent application.

In particular, use may be made, as source of Portland clinker, of a pozzolanic cement of CEM IV type as defined by French Standard NF EN 197-1. Such a cement comprises from 45 to 89% by weight of Portland clinker, with respect to the weight of the said cement. The Portland clinker is preferably as defined in any one of the sections of the present patent application.

In particular, use may be made, as source of Portland clinker, of a blended cement of CEM V type as defined by French Standard NF EN 197-1. Such a cement comprises from 20 to 64% by weight of Portland clinker, with respect to the weight of the said cement. The Portland clinker is preferably as defined in any one of the sections of the present patent application.

The cements described above as a rule comprise calcium sulphate in a content, expressed as $SO_3$ equivalent content, of less than or equal to 4% by weight of the weight of the said cement.

According to a more preferred embodiment, the Portland clinker which can be used according to the invention or which is present in the cements which can be used according to the invention comprises, in addition to the abovementioned crystalline mineralogical phases, at least the following crystalline mineralogical phases $C_3S$, $C_2S$, $C_4AF$, $C_3A$ and $K_2SO_4$ (arcanite).

More preferably, the contents by weight of mineralogical phases $C_3S$, $C_2S$, $C_4AF$, $C_3A$ and $K_2SO_4$ present in the Portland clinker are such that the source of Portland clinker comprises:
 from 60 to 70% by weight of $C_3S$,
 from 5 to 15% by weight of $C_2S$,
 from 2 to 6% by weight of $C_4AF$,
 from 5 to 15% by weight of $C_3A$,
 from 0.1 to 2% by weight of $K_2SO_4$ (arcanite),
 with respect to the weight of the source of Portland clinker.

Preference is given, among the sources of Portland clinker which can be used according to the invention, to the use of a CEM I 52.5 R Portland cement. By way of example, such a cement can comprise:
 from 3 to 4% of calcium sulphate, expressed as % by weight of $SO_3$ in the cement, and
 from 60 to 70% by weight of $C_3S$,
 from 5 to 15% by weight of $C_2S$,
 from 2 to 6% by weight of $C_4AF$,
 from 5 to 15% by weight of $C_3A$,
 from 0.1 to 2% by weight of $K_2SO_4$ (arcanite),
 with respect to the weight of the said cement.

The calcium sulphate present in the CEM I 52.5 R Portland cement can be chosen from gypsum, hemihydrate, anhydrite and their mixture.

Preferably, the content of calcium sulphate present in the CEM I 52.5 R Portland cement, expressed as $SO_3$ content, ranges from 3.5 to 4% by weight of the weight of the said cement.

The lime which can be used according to the invention can be chosen from quicklime (CaO) and slaked lime ($Ca(OH)_2$).

Preferably, the hydraulic binder composition according to the invention comprises at least one source of Portland clinker.

The hydraulic binder composition according to the invention preferably comprises a total content of product(s) chosen from a source of Portland clinker, lime, and their mixture of less than 5% by weight, more preferably ranging from 0.2 to 4% by weight and better still ranging from 0.4 to 1.8% by weight, with respect to the total weight of the hydraulic binder composition.

The hydraulic binder composition according to the invention comprises at least one aluminium derivative chosen from an alumina having a BET specific surface ranging from 100 to 400 square meters per gram ($m^2/g$), a monocalcium aluminate and a calcium sulphoaluminate.

The aluminium derivative which can be used according to the invention is provided in the form of particles.

The alumina which can be used as aluminium derivative preferably has a BET specific surface ranging from 250 to 350 $m^2/g$. In particular, use may be made of a transition alumina (flash alumina) exhibiting such a specific surface.

The BET specific surface is determined by nitrogen adsorption, in accordance with Standard ISO 9277:2010.

The monocalcium aluminate which can be used as aluminium derivative can be introduced into the hydraulic binder composition according to the invention by a calcium aluminate cement (CAC) comprising monocalcium aluminate. In this case, use is preferably made of a calcium aluminate cement for which the alumina content (expressed as $Al_2O_3$) is at least 35% by weight, more preferably at least 45% by weight, more preferably at least 55% by weight, with respect to the weight of the calcium aluminate cement. Better still, use is made of a calcium aluminate cement for which the content of alumina represents from 65 to 75% by weight of the said cement.

The calcium sulphoaluminate which can be used as aluminium derivative is preferably yeelemite ($4CaO.3Al_2O_3.SO_3$).

The yeelemite can be introduced into the hydraulic binder composition according to the invention by a calcium sulphoaluminate cement ("CSA") comprising yeelemite. In this case, use is preferably made of a calcium sulphoaluminate cement for which the content of yeelemite is at least 10% by weight, more preferably at least 50% by weight, and more preferably at least 60% by weight, with respect to the weight of the calcium sulphoaluminate cement. Better still, use is made of a calcium sulphoaluminate cement for which the content of yeelemite represents at least 65% by weight of the weight of the said cement.

The hydraulic binder composition according to the invention preferably comprises from 0.2 to 2.1% by weight and more preferably from 0.3 to 0.8% by weight of at least one aluminium derivative as defined above, with respect to the weight of the hydraulic binder composition.

The hydraulic binder composition according to the invention comprises at least one inorganic or organic alkali metal or alkaline earth metal (Na, Ca, K, Li) salt chosen from chloride salts, bromide salts, silicate salts, nitrate salts or carboxylic acid salts, such as $C_1$-$C_4$ monocarboxylic acid salts.

Preferably, use is made, among the alkali metal or alkaline earth metal salts as defined above, of calcium chloride ($CaCl_2$), calcium formate and/or calcium acetate.

The hydraulic binder composition according to the invention preferably comprises a total content of alkali metal or alkaline earth metal salt(s) as defined above of less than 5% by weight, more preferably ranging from 1 to 4% by weight and better still ranging from 1.1 to 3.2% by weight, with respect to the total weight of the hydraulic binder composition.

The hydraulic binder composition according to the invention is provided in the form of a powder and is obtained by simple mixing of its ingredients, which are themselves provided in the form of solids in the pulverulent state.

Another subject-matter of the present invention is, secondly, a ready-to-mix building material composition comprising:
 a hydraulic binder according to the invention and
 aggregates of inert materials capable of being agglomerated in the aqueous phase by means of the said binder in order to form an aggregated product.

"Ready-to-mix" is understood to mean that the composition according to the invention is intended to be mixed with water immediately before or at the time of its use, for the purpose of the preparation of a building material, such as a mortar or concrete, and in particular an adhesive mortar, a pointing mortar or a levelling mortar or coating. Preferably, the degree of mixing used is as defined below.

The ready-to-mix building material composition according to the invention preferably comprises a content of hydraulic binder ranging from 15 to 75% by weight and more preferably from 20 to 50% by weight, with respect to the weight of the said ready-to-mix composition.

Preferably, the total content of products cited in c) and e) above is less than or equal to 1% by weight, with respect to the weight of the ready-to-mix building material composition.

The aggregates of inert materials which can be used according to the invention can be fillers, sand or gravel as defined by French Standard NF-EN 12-620 (2008) or NF-EN 13-139 (2003).

Preferably, the size of the said aggregates ranges from 1 µm to 8 mm.

Use may be made, as aggregates of inert materials which can be used according to the invention, for example, of limestone or silica or silica/limestone aggregates.

Preferably, use is made of limestone fillers and/or silica sands.

The ready-to-mix building material composition according to the invention preferably comprises a content of aggregates of inert materials ranging from 25 to 85% by weight and more preferably from 50 to 80% by weight, with respect to the weight of the said ready-to-mix composition.

The ready-to-mix building material composition according to the invention preferably additionally comprises at least one polymer.

The polymer which can be used according to the invention can be in the form of a water-dispersible powder or a solid/liquid dispersion in water (that is to say, in the form of an aqueous polymer dispersion).

When the polymer is in the form of a water-dispersible powder, it is preferably chosen from copolymers of vinyl acetate, vinyl versatate and ethylene.

Such polymers are commercially available from Wacker, Hexion and Elotex.

Mention may in particular be made, by way of examples, of:
  the copolymers of vinyl acetate, vinyl versatate and maleic ester available in the powder form from Hexion under the name Axilat® UP 620E,
  the copolymers of vinyl acetate, vinyl versatate and ethylene available in the powder form from Elotex under the name Elotex® FL3200 or FX3300,
  the copolymers of vinyl acetate and ethylene available in the powder form from Wacker under the name Vinnapas® 5011L or Vinnapas® 4023N.

The content of polymer in the form of a water-dispersible powder which can be used in the ready-to-mix building material composition according to the invention is preferably less than or equal to 10% by weight, with respect to the weight of the said ready-to-mix composition according to the invention.

When the polymer is in the form of a solid/liquid dispersion in water, it is preferably chosen from aqueous dispersions of styrene/butadiene, styrene/acrylic, styrene/acrylate, acrylic, vinyl acetate, vinyl acetate and ethylene, and vinyl versatate and ethylene.

Such dispersions of polymer in water are available commercially from Rohm & Haas, BASF and Synthomer.

Mention may in particular be made, by way of examples, of:
  the copolymers of acrylic acid ester and styrene in the form of an aqueous dispersion available from BASF under the name Acronal® DS 5018 (comprising 50% by weight of solid in water),
  the carboxylated styrene-butadiene copolymers available in the form of an aqueous dispersion from Synthomer under the names Lipaton® SB 29Y141 (comprising 47% by weight of solid in water) and Lipaton® SB 29Y146 (comprising 47% by weight of solid in water).

The content of aqueous polymer dispersion which can be used in the ready-to-mix building material composition according to the invention can represent up to 20% by weight of the total weight of the said ready-to-mix composition according to the invention.

The content of polymer in the aqueous dispersion can represent from 30 to 60% by dry weight and preferably from 40 to 55% by dry weight of the total weight of the said aqueous dispersion.

The ready-to-mix building material composition according to the invention can also comprise at least one adjuvant chosen from plasticizers or superplasticizers, antifoam agents, air-entraining agents, water-repellent agents, water-retaining agents or rheological agents, setting or curing retarders, colourants and the mixtures of these compounds.

These adjuvants can be in the solid or liquid state, for example in the powder or aqueous dispersion form.

Preferably, these adjuvants are provided in the powder form.

The ready-to-mix building material composition according to the invention can be a single-component product when it does not comprise a liquid ingredient composed in particular of water. In this case, the ingredients of the ready-to-mix composition according to the invention can be stored in one and the same container, for example in the form of a bag of powder, before being mixed with water in order to form the building material.

The ready-to-mix building material composition according to the invention is generally a two-component product when it comprises at least one liquid ingredient. In this case, the liquid ingredients are stored separately from the other ingredients (pulverulent solids) of the ready-to-mix composition according to the invention and are only mixed at the time of use during the stage of mixing with water. The process for employing the ready-to-mix composition according to the invention is described further below.

According to a preferred alternative embodiment of the invention, the ready-to-mix building material composition according to the invention is a single-component product composed of a pulverulent composition (denoted A')) comprising:
  a hydraulic binder according to the invention,
  aggregates of inert materials capable of being agglomerated in the aqueous phase by means of the said binder in order to form an aggregated product,
  at least one polymer in the water-dispersible powder form as described above, and
  optionally at least one adjuvant in the powder form as described above.

The contents by weight of ingredients described above remain applicable to this preferred alternative embodiment of the ready-to-mix building material composition according to the invention.

According to another alternative embodiment of the invention, the building material composition is a two-component product composed:
of a pulverulent composition (denoted A)) comprising:
a hydraulic binder according to the invention,
aggregates of inert materials capable of being agglomerated in the aqueous phase by means of the said binder in order to form an aggregated product,
of a liquid composition (denoted B)) comprising:
at least one aqueous polymer dispersion as described above and
optionally at least one liquid adjuvant as described above.

The pulverulent composition A) of the two-component product according to the invention can additionally comprise at least one polymer in the water-dispersible powder form as described above and/or at least one adjuvant in the powder form as described above.

The contents by weight of ingredients described above remain applicable to this preferred alternative embodiment of the ready-to-mix building material composition according to the invention.

In each of the two alternative embodiments described above, the pulverulent composition of the single- or two-component product can be obtained by simultaneous mixing of the ingredients of the hydraulic binder with the aggregates of inert materials and the other pulverulent ingredients present or optionally present in the said composition.

A subject-matter of the present invention is thirdly a process for employing a ready-to-mix building material composition according to the invention comprising a stage of mixing the said composition with water for the purpose of the preparation of a building material, such as a concrete or mortar, and in particular an adhesive mortar, pointing mortar or levelling mortar or coating.

In particular, the building material can be prepared from a single-component or two-component product as described above.

When the building material is prepared from a single-component product, the said product is mixed with water.

When the building material is prepared from a two-component product, the liquid ingredients of the said product (liquid composition B)) are mixed with water before the combination is mixed with the nonliquid ingredients of the said product (pulverulent composition A)).

After conclusion of these mixing stages, a homogeneous paste is obtained which will gradually stiffen on contact with water. After 24 hours, a product is obtained which is sufficiently hard to evaluate the mechanical properties of the building material thereof.

The stages described above of the preparation process according to the invention are generally carried out at ambient temperature (approximately 23° C.).

Preferably, the degree of mixing is adjusted so as to obtain, on the conclusion of the preparation process, a product of desired consistency which is easy to employ for the purpose of the targeted use.

The degree of mixing corresponds to the ratio by weight of the amount of water used to prepare the building material according to the invention to the sum of the amounts of the dry materials used to prepare the building material according to the invention.

The water used to prepare the building material according to the invention corresponds to the water added to the ready-to-mix building material composition according to the invention and, if appropriate, to the water of the liquid ingredients of the said composition.

The dry materials used to prepare the building material according to the invention correspond to the nonliquid ingredients of the ready-to-mix building material composition according to the invention and, if appropriate, to the dry matter of the liquid ingredients of the said composition.

Use may be made of a degree of mixing ranging from 0.1 to 0.4.

Preferably, the degree of mixing ranges from 0.1 to 0.3, corresponding to the mixing of 10 to 30 grams of water with 100 grams of solid pulverulent ingredients.

The building material thus obtained is easy to employ.
It can be used in particular as:
fixing mortar, in particular an adhesive mortar, intended for the laying of tiling, such as ceramic or glass tiles;
pointing mortar, intended to fill the voids between different masonry or tiling components,
levelling mortar or coating for floors, walls or ceilings, such as a floor self-levelling coating,
repairing or filling mortar, intended for filling in cracks or cavities at the surface of a building material of identical or different composition, which is essentially inorganic, such as concrete, brick or plaster.

The following examples are given purely by way of illustration of the invention and should not be interpreted in order to limit the scope thereof.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding FR application No. 14/60.440, filed Oct. 30, 2014 are incorporated by reference herein.

EXAMPLES: FLOOR LEVELLING COATINGS

Five ready-to-mix pulverulent compositions are prepared from five different hydraulic binders by mixing the different ingredients of Table 1 below.

The hydraulic binder 1 (according to the invention) is prepared by mixing:
a) 20 g of ground granulated blast furnace slag used according to the invention (representing 64.3% by weight of the weight of the binder),
b) 10 g of synthetic calcium sulphate comprising at least 90% by weight of anhydrous calcium sulphate according to the invention (representing 32.2% by weight of the weight of the binder and corresponding to 18.9% by weight of $SO_3$, with respect to the weight of the binder),
c) 0.20 g of CEM I 52.5 R Portland cement (representing 0.6% by weight of the weight of the binder),
d) 0.1 g of flash alumina with a BET specific surface ranging from 100 to 400 $m^2/g$ (representing 0.3% by weight of the weight of the binder),
e) 0.8 g of $CaCl_2.2H_2O$ (representing 2.6% by weight of the weight of the binder).

The hydraulic binder 2 (comparative) is prepared by mixing:
a) 20.56 g of ground granulated blast furnace slag used according to the invention (representing 66.1% by weight of the weight of the binder), b) 10.28 g of synthetic calcium sulphate comprising at least 90% by weight of anhydrous calcium sulphate according to the invention (representing 33.1% by weight of the weight of the binder and corresponding to 19.4% by weight of $SO_3$, with respect to the weight of the binder), c) 0.26 g of CEM I 52.5 R Portland cement (representing 0.8% by weight of the weight of the binder).

The hydraulic binder 3 (comparative) is prepared by mixing:

a) 20.48 g of ground granulated blast furnace slag used according to the invention (representing 65.8% by weight of the weight of the binder), b) 10.24 g of synthetic calcium sulphate comprising at least 90% by weight of anhydrous calcium sulphate according to the invention (representing 33% by weight of the weight of the binder and corresponding to 19.4% by weight of $SO_3$ with respect to the weight of the binder), c) 0.26 g of CEM I 52.5 R Portland cement (representing 0.8% by weight of the weight of the binder), d) 0.13 g of flash alumina with a BET specific surface ranging from 100 to 400 m²/g (representing 0.4% by weight of the weight of the binder).

The hydraulic binder 4 (comparative) is prepared by mixing:

a) 19.9 g of ground granulated blast furnace slag used according to the invention (representing 64% by weight of the weight of the binder), b) 9.95 g of synthetic calcium sulphate comprising at least 90% by weight of anhydrous calcium sulphate according to the invention (representing 32% by weight of the weight of the binder and corresponding to 18.9% by weight of $SO_3$ with respect to the weight of the binder), c) 0.25 g of CEM I 52.5 R Portland cement (representing 0.8% by weight of the weight of the binder), e) 1 g of $CaCl_2 \cdot 2H_2O$ (representing 3.2% by weight of the weight of the binder).

The hydraulic binder 5 is a reference commercial product composed, to at least 50% by weight, of Portland cement, with respect to the weight of the commercial product.

The ground granulated blast furnace slag used in the examples of the present patent application exhibits the following characteristics:

Particle size: D50=5 μm, maximum particle size <45 μm,
Fineness: Blaine specific surface=7000-8000 cm²/g,
Percentage of glassy phase greater than 90% by weight of the weight of the slag,
Chemical composition of the slag comprising:
  from 33 to 37% by weight of silica ($SiO_2$),
  from 9 to 13% by weight of alumina ($Al_2O_3$),
  from 38 to 42% by weight of calcium oxide (CaO),
  from 1 to 12% by weight of magnesia (MgO),
  less than 1% by weight of $Fe_2O_3$,
  less than 2% by weight of $TiO_2$,
  up to 2.5% by weight of $SO_3$, and
  up to 2% by weight of sulphide ($S^{2-}$) ions,
and the contents by weight of silica ($SiO_2$), alumina ($Al_2O_3$), calcium oxide (CaO) and magnesium oxide (MgO) of which satisfy the following relationships:

$$r1 = \frac{(CaO + MgO)}{(Al2O3 + SiO2)} > 1.03$$

$$r2\ (F11) = \frac{(CaO + MgO + 0.3 * Al2O3)}{(SiO2 + 0.7 * Al2O3)} > 1.20$$

$$r3\ (F3) = \frac{(CaO + MgO + Al2O3)}{(SiO2)} \geq 1.6$$

the sum of the contents by weight of $CaO+MgO+Al_2O_3+SiO_2 \geq 80\%$ by weight, all of the percentages by weight indicated above being expressed on the basis of the total weight of the ground granulated blast furnace slag.

The contents of the ingredients of Table 1 below are expressed in grams.

TABLE 1

| Ingredients | Ex. 1 (Invention) | Ex. 2 (Comparative 1) | Ex. 3 (Comparative 2) | Ex. 4 (Comparative 3) | Ex. 5 (Comparative 4) |
|---|---|---|---|---|---|
| Hydraulic binder 1 | 31.1 | — | — | — | — |
| Hydraulic binder 2 | — | 31.1 | — | — | — |
| Hydraulic binder 3 | — | — | 31.1 | — | — |
| Hydraulic binder 4 | — | — | — | 31.1 | — |
| Hydraulic binder 5 | — | — | — | — | 31.1 |
| Silica sand (0.1-0.3 mm) | 34.2 | 34.2 | 34.2 | 34.2 | 34.2 |
| Calcium carbonate (D50 = 8 μm) | 32.6 | 32.6 | 32.6 | 32.6 | 32.6 |
| Polymer of vinyl acetate, vinyl versatate and ethylene in the powder form | 2 | 2 | 2 | 2 | 2 |
| Cellulose ethers, gums, antifoam agent and colourants | 0.1 | 0.1 | 0.1 | 0.1 | 0.1 |
| Total weight of the pulverulent composition | 100 | 100 | 100 | 100 | 100 |

Each of these five compositions is subsequently mixed with water in order to form a floor coating, in a proportion of 16 g of water per 100 g of pulverulent composition. This corresponds to a degree of mixing of 16% (i.e. 0.16).

Unless otherwise indicated in the present patent application, the preparation of the floor coatings and the measurement of their properties relating to the self-spreading, to the rate of setting, to the flexural strength (Fs), to the compressive strength (Cs) and to the shrinkage were carried out by observing the protocol and the operating conditions defined in the CSTB technical document relating to floor coatings, entitled modalités d'essais et contrôles effectués par le fabricant, n° DT7, Révision 01 [Test methods and controls carried out by the manufacturer, No. DT7, Revised version 01].

I—Series of Tests No. 1 on the Compositions of Examples 1, 2 and 5

I.1—Tests on Wet Product

I.1.1—Preparation of the Mixed Product (Floor Levelling Coating)

Two kilograms of pulverulent composition are kneaded in a bowl with water at a degree of mixing of 16% for 1 minute using a mechanical mixer, such as is described in French Standard NF EN 1937, at slow speed (rotational speed 140 revolutions per minute (rev/min) and planetary rotational speed 62 rev/min). The wall of the receptacle and the beater of the mixer are then stripped using a spatula in order to detach the possibly agglomerated powder. The combined mixture is again kneaded for 1 minute at slow speed (rotational speed 140 revolutions per minute (rev/min) and planetary rotational speed 62 rev/min).

I.1.2—Measurement of the Spreading Diameter and of the Homogeneity of the Floor Levelling Coating The measurements of the spreading diameter and of the homogeneity of the floor coating at 5 minutes and at 20 minutes are carried out starting from one and the same mixed product, prepared as described above in I.1.1.

Measurement at 5 Minutes (Min):

After standing for 5 minutes, the mixed product is poured into a ring with a diameter of 30 mm and a height of 50 mm placed at the centre of a glass sheet. Once filled, the ring is lifted up and releases the product, which spreads over the glass sheet.

After waiting for 5 minutes, the spreading diameter of the product, expressed in millimeters and measured along two perpendicular axes, is recorded and the homogeneity of the spread product is evaluated visually by noting the presence or absence of sedimentation at the circumference of the paste.

The results are listed in the following Table 2 and correspond to the mean value calculated over three tests.

Measurement at 20 Minutes (Min):

After standing for 20 minutes, it is evaluated visually on the mixed product whether the latter has remained homogeneous, that is to say whether there has not been sedimentation of its ingredients at the bottom of the bowl.

The product is subsequently mixed manually with three turns of a blade before being poured into a ring of the same size as described above. The measurement of the spreading diameter of the product is carried out as above, 5 minutes after having lifted up the ring.

The results are listed in the following Table 2 and correspond to the mean value calculated over three tests.

I.1.3—Measurement of the Setting Time (Vicat)

The measurements of the initial set and final set time of the floor coating are carried out starting from one and the same mixed product, prepared as described above in I.1.1.

The measurements of the initial set and final set time of the floor coating are carried out with a Vicat apparatus as described in Standard EN 13454-2.

The mixed product is poured into a standardized mould which is filled in order to carry out the measurements. The mould used is a rubber mould in the form of a truncated cone having upper and lower internal diameters of 7 cm and 8 cm respectively and provided, at its base, with a removable glass sheet which is broader than the rubber mould and which has a thickness of at least 2.5 mm.

The set time is determined by the observation of the penetration of a needle with a diameter of 1.13 mm into the mixed product, under a load of 300 grams, corresponding to the weight specific to the Vicat apparatus.

The initial set corresponds to the time at the end of which the needle ceases to sink in under the effect of the load applied and halts at a distance of 4 mm±1 mm from the bottom of the mould, counting from the start of kneading of pulverulent composition with water.

In order to determine the final set the mould is inverted, after having determined the initial set of the product, and the glass sheet is removed in order to carry out the measurements of sinking of the needle on the face of the product which has been in contact with the glass sheet. The measurements of the sinking of the needle are carried out at different points of the surface of the product.

The final set corresponds to the time at the end of which the needle now for the first time only penetrates 0.5 mm into the product, counting from the start of kneading of pulverulent composition with water.

The results, expressed in minutes, are listed in the following Table 2 and correspond to the mean value calculated over three tests.

I.2—Tests on Cured Product

I.2.1—Preparation of the Test Specimens

The mixed product prepared above in I.1.1 starting from 2 kg of pulverulent composition and water at a degree of mixing of 16% is used to prepare the test specimens which will be used for the tests which follow on the cured floor coating.

The mixed product is poured into each of the three rectangular compartments of a mould, making possible the simultaneous preparation of three test specimens of parallelepipedal shape with a height of 16 cm and having, for base, a square with a side length of 4 cm.

Before removing from the mould, the test specimens are stored, covered with a glass sheet, at 23° C. and 50% relative humidity.

24 hours after start of the kneading with water, the test specimens are removed from the mould.

Once removed from the mould, and between two measurements, the test specimens are stored at 23° C. and 50% relative humidity.

I.2.2—Measurement of the Flexural Strength (Fs)

The flexural strength tests were carried out at 24 hours, 7 days and 28 days after pouring the test specimens, using a flexural and compressive strength testing machine, such as is described in French Standard NF EN 196-1. The device for the flexural strength test comprises two support rolls placed in parallel on one and the same horizontal plane at a distance of 100 mm from one another and a third parallel roll (known as loading roll) surmounting the other two and placed equidistantly from the other two rolls. The three rolls are made of steel and each has a diameter of 10 mm and a length of 48 mm. The test specimen is placed in the apparatus, so as to be held therein by the three rolls, the axes of the three rolls being perpendicular to the length of the test specimen and the axis of the loading roll coinciding with the middle of the length of the test specimen.

A load is applied to the upper lateral face of the test specimen by vertically dropping the loading roll and then the roll is placed back in its initial position. As long as the test specimen does not break, this stage is repeated by applying a greater load. The load applied is gradually increased at a loading rate of 50 newtons per second (N/s) (50 N/s±10 N/s) until the test specimen breaks.

The flexural strength corresponds to the force necessary to break the test specimen and is expressed in megapascals (MPa).

The results are listed in the following Table 2 and correspond to the mean value calculated over three tests.

I.2.3—Measurement of the Compressive Strength (Cs)

The compressive strength tests were carried out on the two halves of each of the test specimens broken according to the protocol for the flexural strength tests described above. In total, six tests are thus carried out for each age of the building material (24 hours, 7 days, 28 days).

A test specimen half is sandwiched between the two parallel movable plates of the measuring device, so that the side faces of the test specimen half are centred and in contact with the movable plates. Each plate has a length of 40 mm and a width of 40 mm.

A load is applied to the test specimen half by exerting a compressive force using the two movable plates and the compressive strength of the test specimen half is simultaneously measured. The load applied is gradually increased at a loading rate of 2400 N/s±200 N/s and the value of the compressive strength (expressed in MPa) is recorded continuously, until rupture, that is to say until the moment when the resistance opposed by the test specimen half is zero.

The results are listed in the following Table 2 and correspond to the mean value calculated over six tests for each age (24 h, 7 d, 28 d).

I.2.4—Measurement of Shrinkage

The measurements of shrinkage were carried out on a series of three test specimens prepared as described above in I.2.1.

The measurements of shrinkage were carried out using a deformeter as described in French Standard NF P15-433 and a rod with a length of 16 cm made of invar acting as reference.

The initial length of each of the test specimens is measured from the removal of the tests specimens from the mould, i.e. 24 hours after the beginning of the kneading of the pulverulent composition with water.

After the measurement, the test specimens are again stored under the same conditions as described above in 1.2.1.

The final length of the test specimens is subsequently measured at 28 days, that is to say 28 days after the start of the kneading of the pulverulent composition with water.

The shrinkage, as being the difference between the final length and the initial length of the test specimen, everything divided by the length of the reference (16 cm), is then calculated for each test specimen.

The results, expressed in micrometers per meter (μm/m), are listed in the following Table 2 and correspond to the mean shrinkage value calculated over the three test specimens.

Results of the Series of Tests No. 1 on the Compositions of Examples 1, 2 and 5

TABLE 2

| Properties of the floor coating | Ex. 1 (Invention) | Ex. 2 (Comparative 1) | Ex. 5 (Comparative 4) |
|---|---|---|---|
| Spreading diameter after standing for 5 min (mm) | 150 | 150 | 150 |
| Sedimentation after standing for 5 min (mm) | no | no | no |
| Spreading diameter after standing for 20 min (mm) | 150 | 150 | 135 |
| Sedimentation after standing for 20 min (mm) | no | no | no |
| Vicat initial set (min) | 230 | 300 | 230 |
| Vicat final set (min) | 270 | 330 | 270 |
| Cs 24 h (MPa) | 8 | 6 | 2 |
| Fs 24 h (MPa) | 2 | 2 | 0.5 |
| Cs 7 d (MPa) | 35 | 30 | 10 |
| Fs 7 d (MPa) | 5 | 5 | 2 |
| Cs 28 d (MPa) | 40 | 35 | 20 |
| Fs 28 d (MPa) | 6 | 6 | 5 |
| Shrinkage at 28 days (μm/m) | <1500 | <2000 | <2000 |

These test results show that:
- the floor coating according to the invention (ex. 1) does not sediment and exhibits a good property of self-spreading over time,
- the floor coating according to the invention (ex. 1) has very good short-term compressive mechanical strengths while having a suitability for the use desired for its employment. The comparative floor coatings (ex. 2 and 5) do not make it possible, for equivalent set times, to obtain satisfactory short-term compressive mechanical strengths,
- the kinetics of the mechanical strengths of the floor coating according to the invention are also better, with respect to the reference floor coating,
- the floor coating according to the invention exhibits better flexural strength values than the reference floor coating. The flexibility of the cured floor coating according to the invention makes it possible to gain in particular in durability when the floor is subjected to deformations or vibrations,
- the floor coating according to the invention exhibits a reduced shrinkage and thus an improved dimensional stability, with respect to the comparative floor coatings. In particular, no cracking is observed on the cured product of the invention.

II—Series of Tests No. 2 on the Compositions of Examples 1 to 4

Measurement of the Set Time and of the Total Heat of Hydration (by Isothermal Calorimetry)

The measurements of set time and of total heat of hydration are carried out on a sample of 7.5 grams of mixed product, prepared as described above in I.1.1.

The sample is introduced into a thermally sealed ampoule. The ampoule is introduced into a TAM Air isothermal calorimeter regulated at 23° C., having a thermally sealed reference ampoule containing water. The amount of water present in the reference ampoule is calculated in a way well known to a person skilled in the art so that the heat capacity of the measurement ampoule containing the mixed product is equal to the heat capacity of the reference ampoule. Isothermal calorimetry makes it possible to measure the differences in heat between the sample and the reference.

As the hydration reaction of the hydraulic binder, which is responsible for the setting and the curing of the binder, is exothermic, the differences in heat brought about by this reaction are monitored as a function of the time by isothermal calorimetry, in order to evaluate the reactivity of the binder on contact with water.

The curve of heat flow given off by the mixed product (in watts per gram of product) and the curve of heat given off by the mixed product (in Joules per gram of product) are plotted as a function of the time elapsed, counting from the preparation of the mixed product (up to approximately 72 hours), for each floor coating tested.

The curve of heat flow given off by the mixed product as a function of the time, represented by FIG. 1, illustrates the kinetics of hydration of the different floor coatings tested (FIG. 1).

The curve of heat given off by the mixed product as a function of the time, represented by FIG. 2, makes it possible to determine the value of the initial set and final set of the product by looking for the inflection points. However, this proves to be difficult in practice. Consequently, the first derivative $d(q)/d(t)$ of the curve of heat flow given off by the mixed product as a function of the time is plotted in FIG. 3 for each of the floor coatings tested, in order to more accurately identify the initial set and final set values of each of these products.

The initial set (Ins) and final set (FiS) are identified using FIG. 3, and thus the total heat given off by the product 72 hours after its hydration.

The initial set value corresponds to the time elapsed, counting from the preparation of the mixed product, at which the maximum of the derivative $d(q)/d(t)$ is reached. The final set value corresponds to the time elapsed, counting from the preparation of the mixed product, at which the value of the derivative $d(q)/d(t)$ is zero.

The initial set and final set of the binder make it possible to characterize the rate of setting of the binder and thus the reactivity of the latter on contact with water. In particular, the initial set of the binder corresponds to the moment, counting from the start of the mixing with water, when the product suddenly thickens and begins to heat up while the final set of the binder, which coincides with the start of the curing of the binder, corresponds to the moment, counting from the start of the mixing with water, when the product becomes stiff and ceases to be deformable. The emission of heat begins to slow down from this moment.

The total heat given off by the product during its hydration is correlated with the mechanical properties developed by the product during its hydration.

The total heat given off by the product, measured after 72 hours of hydration, thus makes it possible to characterize the degree of stiffness achieved by the product.

In fact, the greater the kinetics of the hydration reaction and the greater the total heat of hydration of the product, the greater the activation of the binder.

The result are collected in the following Table 3 and are illustrated by the calorimetry curves represented in FIGS. 1 to 3.

Results of the Series of Tests No. 2 on the Compositions of Examples 1 to 4

TABLE 3

|  | Ex. 1 (Invention) | Ex. 2 (Comparative 1) | Ex. 3 (Comparative 2) | Ex. 4 (Comparative 3) |
| --- | --- | --- | --- | --- |
| InS (hours) | 3.2 | 6.5 | 4.7 | 5.1 |
| FiS (hours) | 5.3 | 8.9 | 6.9 | 7.1 |
| Total heat of hydration after 72 h (J/g) | 45.4 | 37.3 | 37.6 | 45.3 |

The floor coating according to the invention (ex. 1), comprising a four-component activation system, exhibits a set time which is lower and a total of heat of hydration after 72 h which is greater than the values found for the comparative floor coatings (ex. 2 to 4) comprising, at a comparable content, an activation system having two or three components only.

These test results thus show that the floor coating according to the invention (ex. 1) exhibits an improved rate of setting and makes it possible to achieve, beyond 72 h of hydration, an improved mechanical strength, with respect to the comparative floor coatings (ex. 2 to 4), which exhibit a different activation system.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

Figure 1:
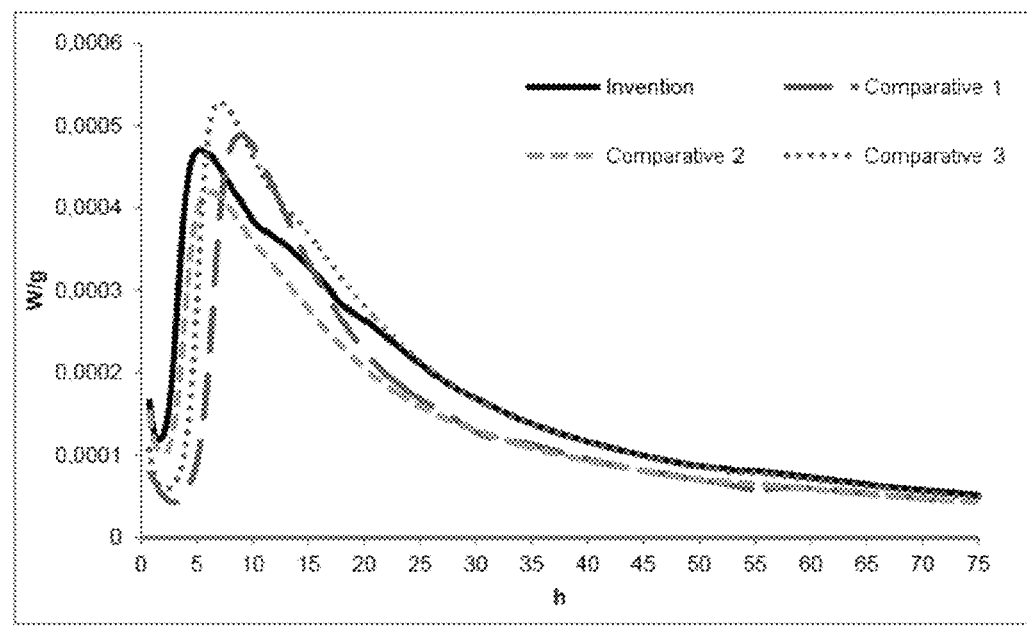
FIG. 1 illustrates the kinetics of hydration of the different floor coatings tested.
Figure 2:
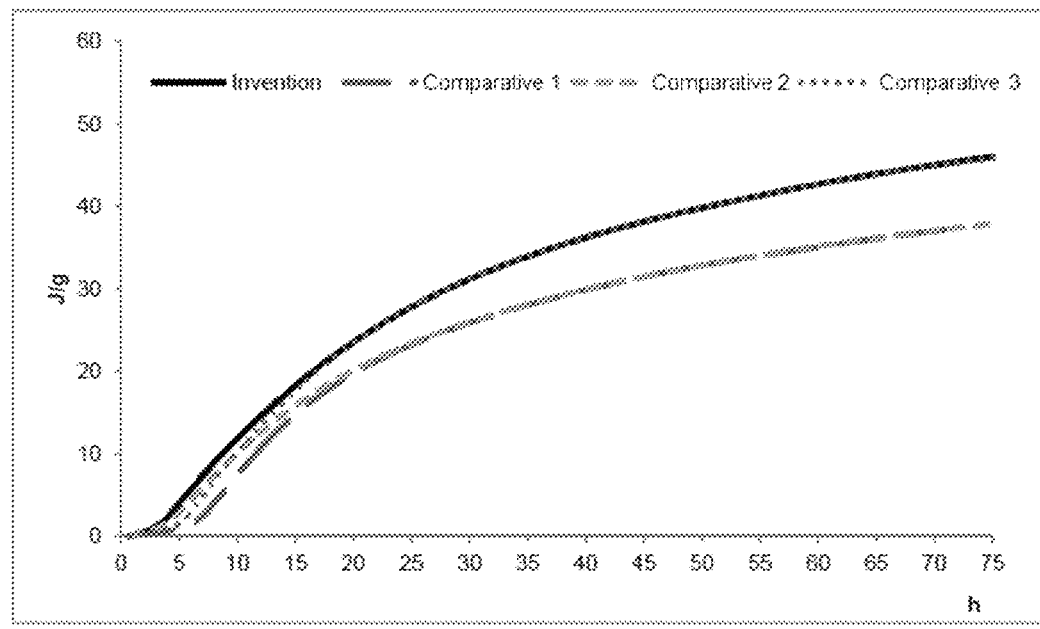
FIG. 2 makes it possible to determine the value of the initial set and final set of the product by looking for the inflection points.
Figure 3:
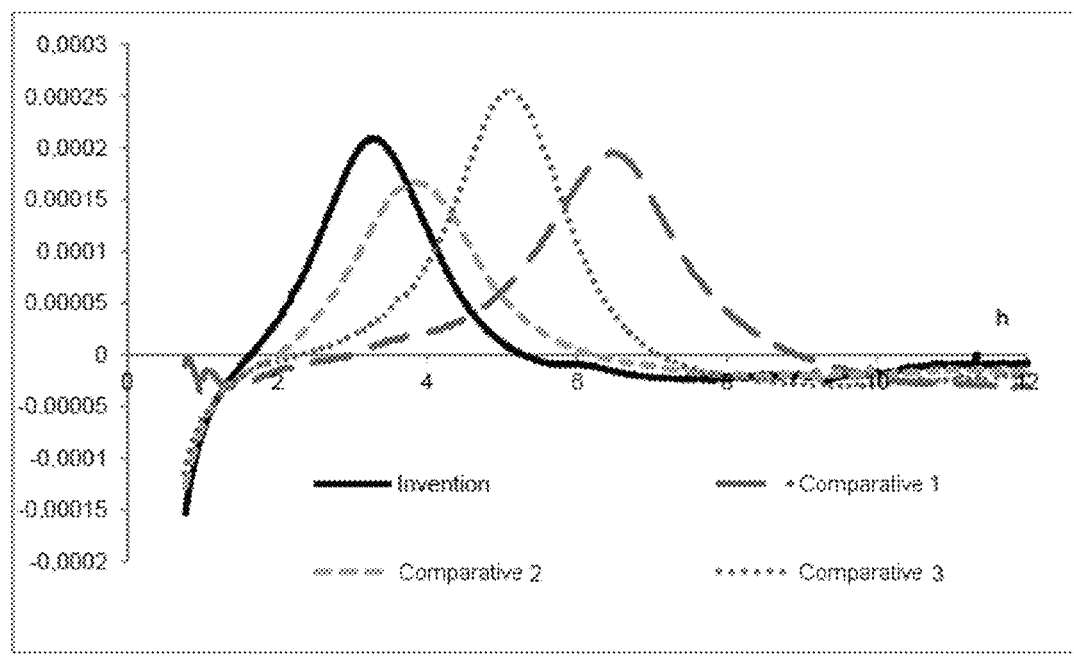
FIG. 3 represents more accurate initial set and final set values.

The invention claimed is:

1. A hydraulic binder composition comprising each of a-e:
   a) at least 50% by weight, with respect to the weight of the hydraulic binder composition, of a ground granulated blast furnace slag,
   b) calcium sulphate,
   c) at least one source of Portland clinker or lime,
   d) at least one aluminium derivative that is an alumina having a BET specific surface ranging from 100 to 400 $m^2/g$, a monocalcium aluminate or a calcium sulphoaluminate, and
   e) at least one alkali metal or alkaline earth metal salt that is a chloride salt, bromide salt, silicate salt, nitrate salt or carboxylic acid salt,
   the total content of calcium sulphate, expressed as $SO_3$ equivalent content, being at least 5% by weight, with respect to the weight of the hydraulic binder composition,
   the sum of the contents of c) and e) being less than 10% by weight, with respect to the weight of the hydraulic binder composition.

2. The hydraulic binder composition according to claim 1, wherein in the ground granulated blast furnace slag the amounts of calcium oxide, magnesia, alumina and silica satisfy at least one of the following three relationships:

$$r1 = \frac{(CaO + MgO)}{(Al2O3 + SiO2)} > 1.03$$

$$r2\ (F11) = \frac{(CaO + MgO + 0.3*Al2O3)}{(SiO2 + 0.7*Al2O3)} > 1.20$$

$$r3\ (F3) = \frac{(CaO + MgO + Al2O3)}{(SiO2)} \geq 1.6,$$

and the content of aluminium oxide ($Al_2O_3$) being less than 13% by weight of the weight of ground granulated blast furnace slag, r1, r2 and r3 corresponding to the ratios by weight relating to the amounts of calcium oxide, magnesia, alumina and silica present in the ground granulated blast furnace slag.

3. The hydraulic binder composition according to claim 1, having a Blaine specific surface of the ground granulated blast furnace slag from 7000 to 8000 $cm^2/g$.

4. The hydraulic binder composition according to claim 1, having a maximum size of particles of the ground granulated blast furnace slag less than 45 µm.

5. The hydraulic binder composition according to claim 1, comprises having a total content of ground granulated blast furnace slag(s) of 60 to 70% by weight, with respect to the weight of the hydraulic binder composition.

6. The hydraulic binder composition according to claim 1, wherein the calcium sulphate comprises at least 90% by weight of anhydrous calcium sulphate, with respect to the weight of calcium sulphate.

7. The hydraulic binder composition according to claim 1, having a total content of a source of Portland clinker, lime, or their mixture of 0.2 to 4% by weight, with respect to the total weight of the hydraulic binder composition.

8. The hydraulic binder composition according to claim 1, having a total content of aluminium derivative(s) of 0.2 to 2.1% by weight, with respect to the total weight of the hydraulic binder composition.

9. The hydraulic binder composition according to claim 1, having a total content of alkali metal or alkaline earth metal salt(s) of less than 5% by weight, with respect to the total weight of the hydraulic binder composition, the said salt(s) being calcium chloride ($CaCl_2$), calcium formate and/or calcium acetate.

10. The hydraulic binder composition according to claim 1, wherein the carboxylic acid salts in (e) are $C_{1-4}$-monocarboxylic acid salts.

11. A ready-to-mix building material composition comprising:
   a hydraulic binder as defined in claim 1, and
   aggregates of inert materials capable of being agglomerated in aqueous phase by means of the said binder in order to form an aggregated product.

12. The ready-to-mix composition according to claim 11, comprising at least one polymer in the form of a water-dispersible powder or in the form of an aqueous polymer dispersion.

13. A process for employing a ready-to-mix composition as defined in claim 11, comprising mixing the said composition with water to prepare a building material.

14. The process according to claim 13, comprising preparing an adhesive mortar, pointing mortar or levelling mortar or coating.

\* \* \* \* \*